United States Patent
Ahlgren et al.

(10) Patent No.: US 6,968,209 B1
(45) Date of Patent: Nov. 22, 2005

(54) METHOD AND APPARATUS FOR SYNCHRONIZING DATABASES IN PORTABLE COMMUNICATION DEVICES

(75) Inventors: Kristina Ahlgren, Malmö (SE); Jörgen Birkler, Malmö (SE); Lars Novak, Bjärred (SE); Carl Gustavsson, Lund (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/507,685

(22) Filed: Feb. 22, 2000

(30) Foreign Application Priority Data

Jul. 5, 1999 (CA) ............................................. 2276840

(51) Int. Cl.$^7$ ............................ H04B 15/00; H04M 1/00
(52) U.S. Cl. ...................... 455/558; 455/13.2; 455/466; 455/502; 370/350; 707/203; 707/204; 713/168
(58) Field of Search ............................... 455/558, 13.2, 455/466, 553, 554, 550, 566, 551

(56) References Cited

U.S. PATENT DOCUMENTS

| | | | |
|---|---|---|---|
| 4,841,131 A | | 6/1989 | Iijima ........................ 235/380 |
| 5,418,837 A | | 5/1995 | Johansson et al. ............ 379/58 |
| 5,649,089 A | * | 7/1997 | Kilner ........................ 707/204 |
| 5,765,172 A | * | 6/1998 | Fox ............................. 707/200 |
| 5,974,238 A | * | 10/1999 | Chase, Jr. .................... 707/200 |
| 5,974,574 A | * | 10/1999 | Lennie et al. ................. 714/52 |
| 6,278,885 B1 | * | 8/2001 | Hubbe et al. ............... 455/466 |

FOREIGN PATENT DOCUMENTS

| | | |
|---|---|---|
| EP | 0 609 156 | 8/1994 |
| GB | 2 313 736 | 12/1997 |

OTHER PUBLICATIONS

Digital Cellular Telecommunications System (Phase 2);"Specification of the Subscriber Identity Module–Mobile Equipment (SIM–ME) Interface", European Telecommunications Standards Institute, GSM 11.11, Version 4.18.0, dated Aug. 1996, Fourth Edition.

European Standard Search Report, File No. RS 104702, mailed Sep. 15, 2000.

* cited by examiner

*Primary Examiner*—David Hudspeth
*Assistant Examiner*—S. Smith
(74) *Attorney, Agent, or Firm*—Potomac Patent Group PLLC

(57) ABSTRACT

A checksum is calculated on a database stored in a SIM card when changes are made to a database stored therein. This checksum can be stored in a mobile phone, e.g., with the change log. When synchronization between devices is to be performed, another checksum can be calculated on the database stored in the SIM card. If the stored checksum does not match the calculated checksum, then a change has occurred in the contents of the database that is not reflected in the change log. Accordingly, a full synchronization process can be performed wherein the database records in each device can be compared. If, on the other hand, the checksums match, then the change log accurately reflects any changes made to the database stored in the SIM card and the synchronization process can proceed more expediently using the change log.

3 Claims, 4 Drawing Sheets

METHOD AND APPARATUS FOR SYNCHRONIZING DATABASES IN PORTABLE COMMUNICATION DEVICES

PRIORITY APPLICATION

This application claims priority from Canadian Patent Application Serial No. 2,276,840, filed on Jul. 5, 1999, the disclosure of which is incorporated here by reference.

BACKGROUND

The present invention relates generally to communications systems and, in particular, to techniques which provide for synchronizing databases, e.g., a database containing a phonebook stored in a subscriber identity module (SIM) of a mobile station used in a radiocommunication system, e.g., a cellular or satellite radiocommunication system.

The cellular telephone industry has made phenomenal strides in commercial operations in the United States as well as the rest of the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as maintain high quality service and avoid rising prices.

One recognized trend is the convergence of the so-called information industry, as symbolized by the evolution of the personal computer (PC), and the so-called communications industry, as symbolized by the evolution of the mobile phone. Both types of devices are characterized by rapidly increasing performance (hardware) and by increased application (software) capabilities. In the near future, it is likely that mobile phones will communicate more directly with other information devices, such as the PC, to exchange information. Many subscribers of wireless services also own personal computers and, as each type of device gets more sophisticated in its data handling capability, may wish to exchange data therebetween, e.g., between databases (such as phone books), stored in each device.

Consider the example illustrated in FIG. 1. Therein, a PC 10 and a mobile phone 20 are linked together via communication link 30. It will be appreciated by those skilled in the art that while a PC and mobile phone are used as examples of two devices between which database synchronization may be performed that the present invention is not limited to these two types of devices and may, in fact be applied to database synchronization between any two types of devices e.g., electronic organizers, pagers, etc. The PC 10 includes a database 40, e.g., containing phone records, while the mobile phone 20 includes a corresponding database stored on its subscriber identity module (SIM) card 50. As will be appreciated by those skilled in the radiocommunication arts, the SIM card is a removable smart card that was created for the GSM radiocommunication standard as a mechanism to conveniently group and store information elements related to the mobile subscriber in a removable manner, which card is insertably removable from mobile phones. The term "synchronize" as it is used herein to refer to database operations associated with two or more devices means changing the contents of one database so that it mirrors the contents of the other database.

Conventionally, to synchronize the database 40 and the database stored on SIM card 50, it was necessary to individually compare each record in each database. For example, the database of phonebook records stored in SIM card 50 could be transmitted to PC 10 via link 30. Then, the records in each database could be compared and updated such that the two databases mirrored one another. Changes to the database stored in the SIM card 50, e.g., associated with records found in the database 40 but not found in the version of the database transmitted from the mobile phone 20 to the PC 10, could then be relayed back to the mobile phone 20 to update the SIM card's phonebook. This synchronization process is complicated and time consuming.

To address this problem, a change log can be added to the devices as shown in FIG. 2. The change log contains information regarding records which have been operated upon in either database subsequent to synchronization therebetween. The change log can be implemented, for example, in a portion of memory which records for each change an event (e.g., add, delete or modify), the identity of the database record for which the event occurred and a timestamp indicating when the event took place. For example, if a phone record is added to database 40 in PC 10 subsequent to it being synchronized with mobile phone 20, then an indication of such will be found in change log 200. Likewise, if the subscriber associated with mobile phone 20 (and SIM card 50) deletes a record in his or her phonebook, then this change will be reflected in change log 205. Using change logs 200 and 205 is advantageous during synchronization since only those records which have been modified, added or deleted (as recorded in the change log) since the last synchronization update need to be transmitted between the devices. Thus, the synchronization process may be performed more rapidly.

Unfortunately, although this improves the synchronization process, adding the change logs introduces another problem. Since memory on the SIM card 50 is limited, it is likely that the change log will be stored in another memory device in the mobile phone 20, e.g., local RAM (not shown), rather than on the SIM card 50 itself, as is the database. This may be problematic when the SIM card 50 is transferred to another mobile phone as depicted in FIG. 3. In this example, consider that SIM card 50 has been transferred from mobile phone 20 to mobile phone 300, e.g., the subscriber of mobile phone 20 has borrowed mobile phone 300. Then, the subscriber makes a change to his or her phonebook while using mobile phone 300. This change is reflected in change log 305, but not in change log 210. After re-installing SIM card 50 into mobile phone 20, the subscriber initiates the synchronization process, however since change log 210 does not include the change or changes made to the database in the SIM card 50, the PC cannot be updated with those changes.

Accordingly, it would be desirable to provide techniques and apparatuses which enable the usage of change logs for synchronizing databases, but also accommodate the portability of SIM cards and the like.

SUMMARY

These and other drawbacks of conventional techniques are overcome according to exemplary embodiments of the present invention, wherein a checksum is calculated on a database stored in a SIM card when changes are made to the database. This checksum can be stored in the mobile phone, e.g., with the change log. When synchronization between devices is to be performed, another checksum can be calculated on the database stored in the SIM card. If the stored checksum does not match the calculated checksum, then a change has occurred in the contents of the database that is not reflected in the change log. Accordingly, a full synchronization process can be performed wherein the database records in each device can be compared. If, on the other hand, the checksums match, then the change log accurately reflects any changes made to the database stored in the SIM card and the synchronization process can proceed more expediently using the change log. In this way changes made to the database stored in the SIM card can be accommodated during synchronization regardless of whether the SIM card has been moved to another device and updated while used in the other device.

According to another exemplary embodiment of the present invention, phonebook records stored in a SIM database can be enhanced to provide for efficient synchronization. For example, a phonebook identifier (PID) can be stored in a predefined field in the SIM card. The PID can be used to determine whether the phonebook is the same or different than the phonebook which was previously synchronized with another device, e.g., a PC. A user identifier (UID) field can also be added for each record in the phonebook. The UID is used to detect record changes and also to identify a latest version of each record.

It shall be emphasized that the term "comprises/ comprising" when used in this specification is taken to specify the presence of stated features, integers, steps or components but does not preclude the presence or addition of one or more other features, integers, steps components or groups thereof.

BRIEF DESCRIPTION OF THE DRAWINGS

The above objects and features of the present invention will be more apparent from the following description of the exemplary embodiments with reference to the accompanying drawings, wherein.

DETAILED DESCRIPTION

The following description is written in terms of a cellular radiotelephone system, but it will be understood that Applicants' invention is not limited to that environment. More specifically, the following description is written using terms which may be associated with GSM compliant systems, e.g., "SIM card", but it will be understood by those skilled in the art that the present invention may be implemented in other communication/information handling applications including those which are designed in accordance with other standards, e.g., IS-95 or PDC, as well as those which use other access methodologies, e.g., CDMA. Moreover, the following techniques are also applicable to synchronizing databases between any two information/communication devices.

As mentioned above, however, the present invention finds particular application to the synchronization of databases between devices wherein at least one of the devices has a removable SIM card, e.g., a mobile phone. Those skilled in the art will be familiar with details regarding SIM cards per se, which details are, therefore, not repeated here. However, the interested reader is referred to the document entitled "Specification of the Subscriber Identity Module-Mobile Equipment (SIM-ME) Interface", GSM 11.11, Version 4.10.0, dated Jan. 21, 1994, the disclosure of which is incorporated here by reference, for a discussion of SIM card specifications.

According to one exemplary embodiment of the present invention, a checksum is calculated using the values of the records of the database stored in the SIM card. The calculation of checksums per se is well known in the art and any known type of checksum calculation can be employed, for example a cyclic redundancy check known as CRC-16 can be used over the entire database. When the database is modified, e.g., a record is added, deleted or modified, a new checksum is calculated. The checksum (e.g., 2 bytes/ phonebook) will, therefore, change whenever the database is modified. The calculated checksum can then be stored and used to aid in tracking changes to the database stored in the SIM card even when the SIM card is moved between different mobile phones, as will be described below.

Figure 1:
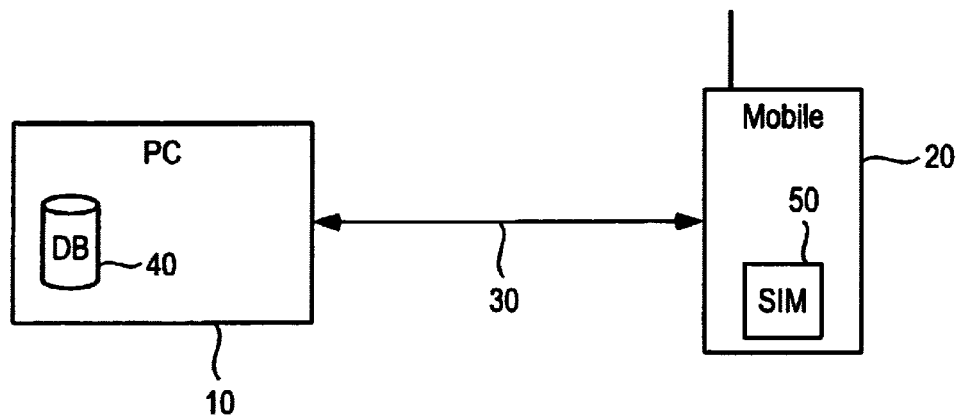
FIG. 1 illustrates a conventional technique for synchronizing databases between devices.
Figure 2:
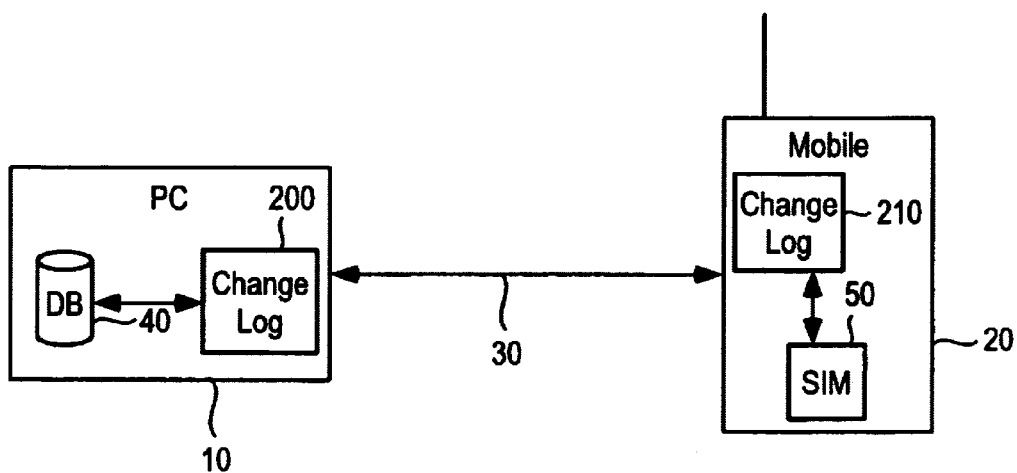
FIG. 2 illustrates a modification of the technique and system of FIG. 1, wherein change logs are introduced into each device for synchronizing the database.
Figure 3:
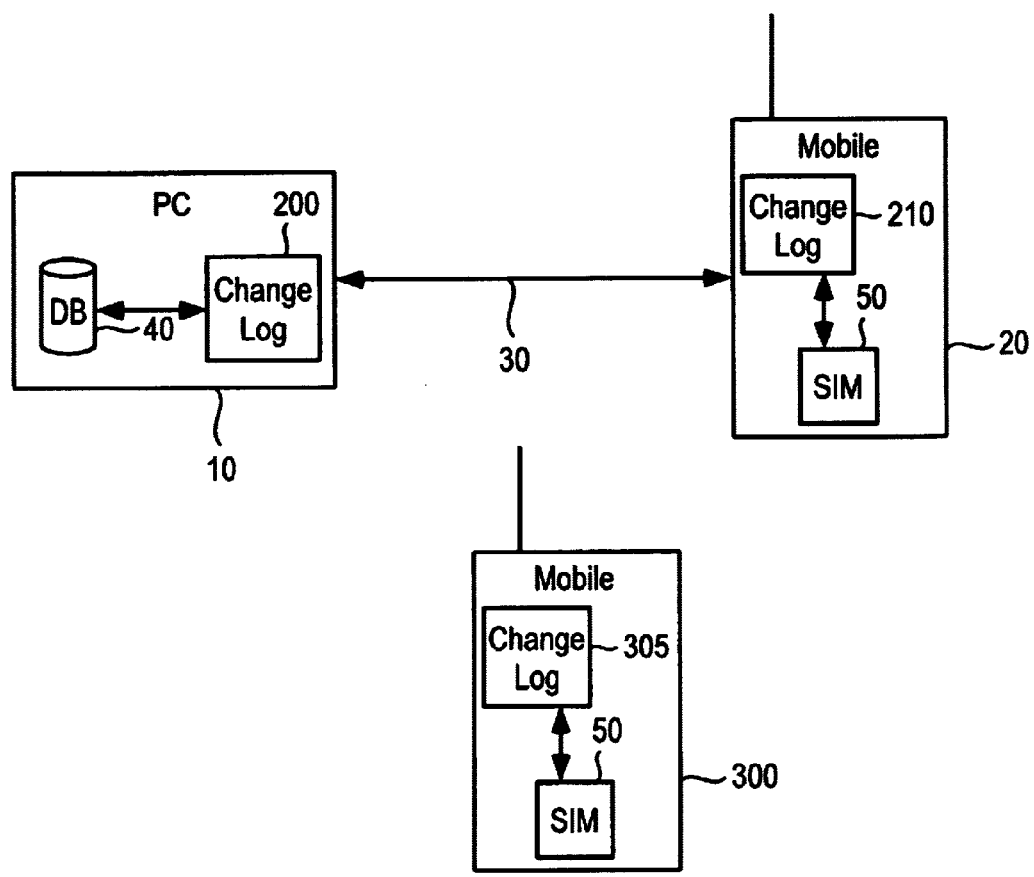
FIG. 3 depicts the problem associated with using change logs when a SIM card is moved between devices.

Consider once again the situation illustrated in FIG. 3. When the SIM card 50 initially resides in mobile phone 20, the database stored thereon will have a first checksum associated therewith. This first checksum is stored both in the SIM card 50 and in a memory location in the mobile phone. If the database is modified while the SIM card 50 is in the mobile phone 20, then a second checksum will be created which is, once again, stored in both the SIM card 50 and the mobile phone 20. At this time the change log 210 is also updated to reflect the changes made to the database stored in SIM 50.

If, however, the SIM card 50 is inserted into a different mobile phone 300, and the database is modified, a third checksum will be calculated and stored on the SIM card 50 (as well as mobile phone 300). The third checksum stored in SIM card 50 will be different than the second checksum currently stored in mobile phone 20 due to the change(s) made to the database while the SIM card was resident in mobile phone 300. When the SIM card 50 is subsequently re-inserted into the mobile phone 20, the mobile phone 20 will detect the mismatch between the second checksum stored in its memory and the third checksum stored in the SIM card 50. The mobile phone 20 will then know that the database stored on the SIM card 50 has been changed in a manner that is not, for example, reflected in its stored change log and can use this knowledge in any desired manner to aid in synchronizing the databases, e.g., setting a flag indicating that a full synchronization process is needed when a mismatch is detected between the checksum stored in the SIM card and the checksum stored in the mobile phone.

Figure 4:
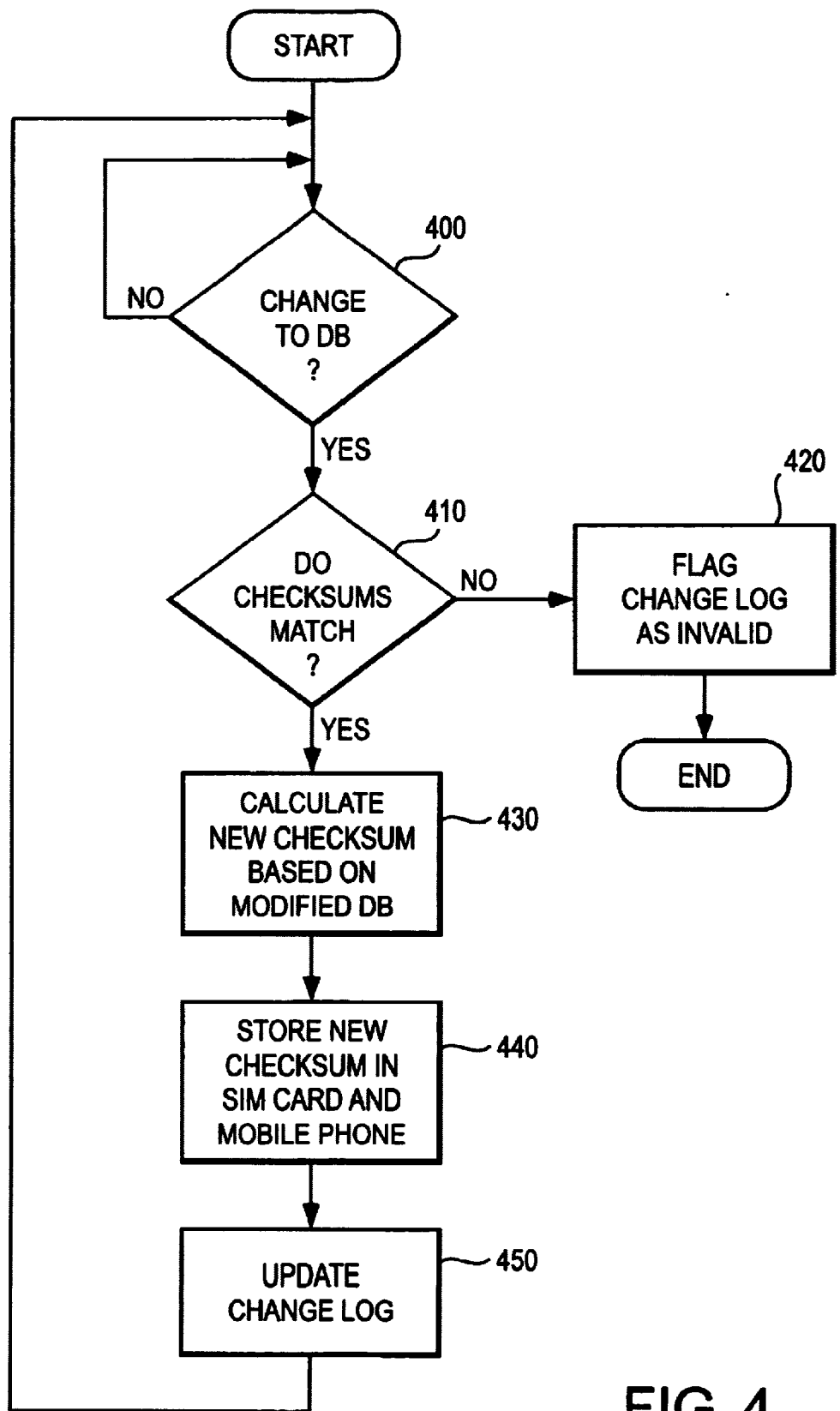
FIG. 4 depicts a flowchart depicting an exemplary method according to the present invention.

As one example of the manner in which checksums can be used to enhance database synchronization according to the present invention, consider the flowchart of FIG. 4. This process may be initiated whenever a change is made to the database in the SIM card 50 at step 400. Next, at step 410, the checksums stored in the mobile phone 20 and the SIM card 50 are compared to determine whether the database stored in the SIM card 50 has been changed since the change log 210 was last updated. As discussed above, this can occur if the SIM card 50 is used in another device and the database, e.g., phonebook or calendar, is modified.

If the checksums don't match, then the process moves on to block 420 wherein corrective action is taken, e.g., the change log is flagged as invalid. This means that, for example, when synchronization is performed between two devices, e.g., the mobile phone and a PC, a full synchronization will need to be done since the change log does not reflect all of the changes which have been made to the database. The phrase "full synchronization" in this context refers to a record by record comparision between the databases stored in the two devices to ensure that the databases mirror one another. Alternatively, the mobile phone 20 may rebuild the change log 210 by determining what changes have been made that are not reflected by the change log 210.

If, on the other hand, the comparison in step 410 indicates a match, then the mobile phone knows that its change log is valid. Thus, at step 430, a new checksum is calculated using the modified database. The new checksum is then stored at block 440 in both the SIM card 50 and the memory of the mobile phone 20. Additionally, the change log 210 is updated to reflect the modification(s) made to the database in the SIM card 50. This process can be repeated whenever changes are made to the database.

Figure 5:
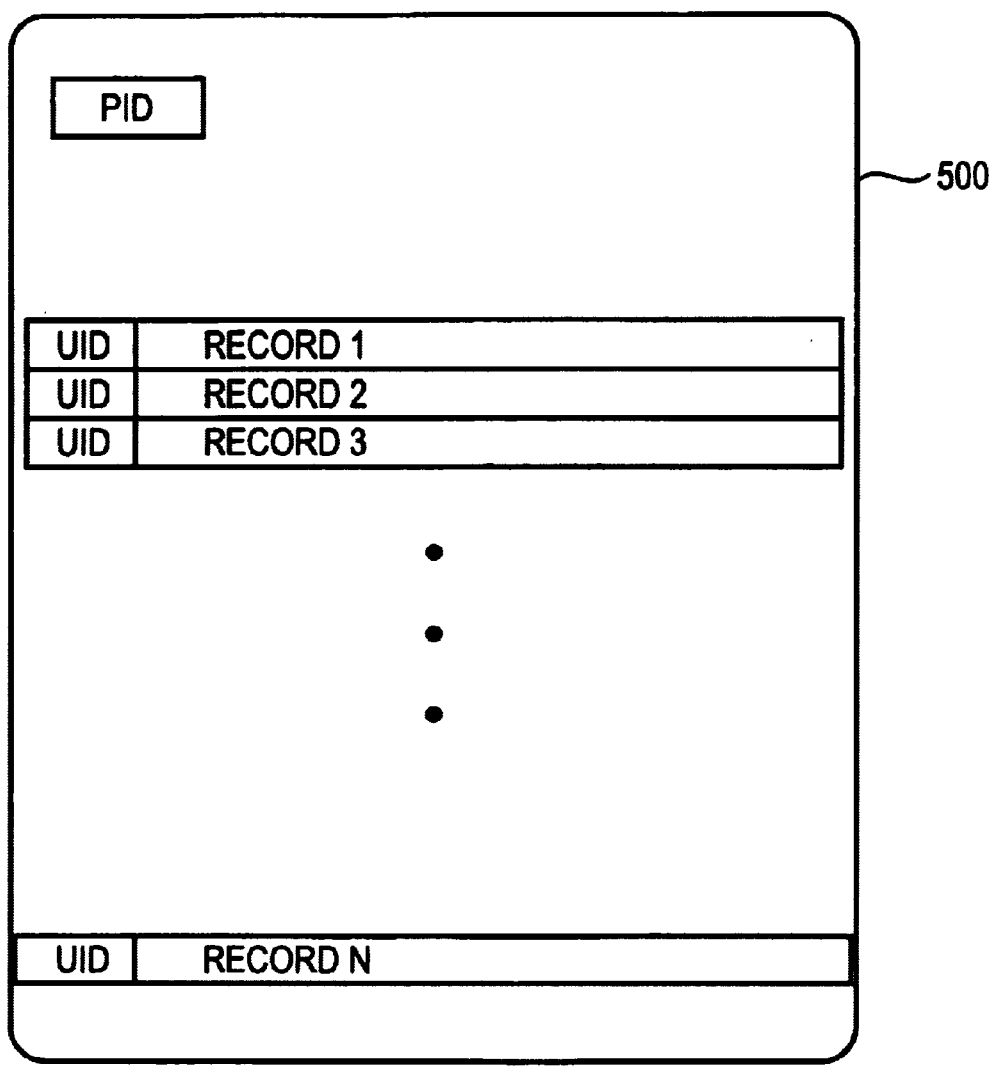
FIG. 5 illustrates various fields in databases to be synchronized according to exemplary embodiments of the present invention.

According to another exemplary embodiment of the present invention, phonebook records stored in a SIM database can be enhanced to provide for efficient synchronization as conceptually illustrated in FIG. 5. For example, a phonebook identifier (PID, or more generally a database identifier (DID), can be stored in a predefined field in the SIM card database 500. The PID (e.g., 4 bytes per phonebook) can be used to determine whether the phonebook is the same or different than the phonebook which was previously synchronized with another device, e.g., a PC. A user identifier (UID) 510-field can also be added for each record in the phonebook. The UID (e.g., 2 bytes/record) is used to detect record changes and also to identify a latest version of each record. In order to avoid running out of available UID values, the PID can be used as (effectively) higher order UID bits. When needed additional PID values can be added for the SIM card to provide additional UID values.

The present invention is applicable to many different types of electronic devices which employ databases. For example, portable radio devices, personal digital assistants and communicators, electronic organizers, communicators, pagers, smart phones, etc., can all employ techniques and structures according to the present invention. Moreover, electronic devices having any type of removable memory structure, such as a smart card, SIM card, etc. can employ the present invention.

While the present invention has been described with respect to certain exemplary embodiments, one skilled in the art will appreciate that the invention would equally apply to other such systems. For example, those skilled in the art will appreciate that there are many ways in which checksums can be used to address the problem associated with change logs and database synchronization described above and that the present invention is intended to encompass embodiments in addition to those illustrative embodiments described herein. Many variants and combinations of the techniques taught above may be devised by a person skilled in the art without departing from the spirit or scope of the invention as described by the following claims.

What is claimed is:

1. A method for tracking changes to a database stored in a smart card associated with electronic equipment, the method comprising the steps of:

storing, in both a memory of said electronic equipment and said smart card, a checksum associated with said database, wherein said electronic equipment includes a mobile phone;

making a change to said database;

comparing said checksum stored in said memory of said electronic equipment and said checksum stored in said smart card;

calculating, after said change, a modified checksum based on said database;

storing said modified checksum in said memory of said electronic equipment and in said smart card;

logging said change in a chance log in said electronic equipment;

flagging said change log as invalid if said checksums do not match as a result of said comparing step; and synchronizing said database stored in said smart card with a corresponding database stored in another device using a method which is selected depending upon whether said change log is valid.

2. A method for updating a change log associated with a database stored in a smart card, wherein said smart card is associated with electronic equipment and wherein said electronic equipment includes a mobile phone, the method comprising the steps of:

providing a first memory location and a second memory location for storing a first checksum and a second checksum, respectively;

determining, before a modification is made to said database, if said first and second checksums match;

selectively updating a change log with said modification based on a result of said determining step;

invalidating said change log if said first and second checksums do not match; and synchronizing said database with a corresponding database stored in another device by comparing each element in said database and said corresponding database.

3. A method for updating a change log associated with a database, the method comprising the steps of:

providing a first memory location and a second memory location for storing a first checksum and a second checksum, respectively;

determining, before a modification is made to said database, if said first and second checksums match;

selectively updating a change log with said modification based on a result of said determining step;

invalidating said change log if said first and second checksums do not match; and synchronizing said database with a corresponding database stored in another device by comparing each element in said database and said corresponding database, wherein said database is stored in a mobile phone and said another device is a personal computer.

* * * * *

UNITED STATES PATENT AND TRADEMARK OFFICE
CERTIFICATE OF CORRECTION

PATENT NO. : 6,968,209 B! Page 1 of 1
APPLICATION NO. : 09/507685
DATED : November 22, 2005
INVENTOR(S) : Ahlgren et al.

It is certified that error appears in the above-identified patent and that said Letters Patent is hereby corrected as shown below:

Column 6, line 17, change "chance" to --change--

Signed and Sealed this

Fifth Day of September, 2006

JON W. DUDAS
*Director of the United States Patent and Trademark Office*